No. 719,337. PATENTED JAN. 27, 1903.
R. N. HOLMES.
COMBINED FLOUR TANK AND SIFTER.
APPLICATION FILED FEB. 13, 1902.
NO MODEL.
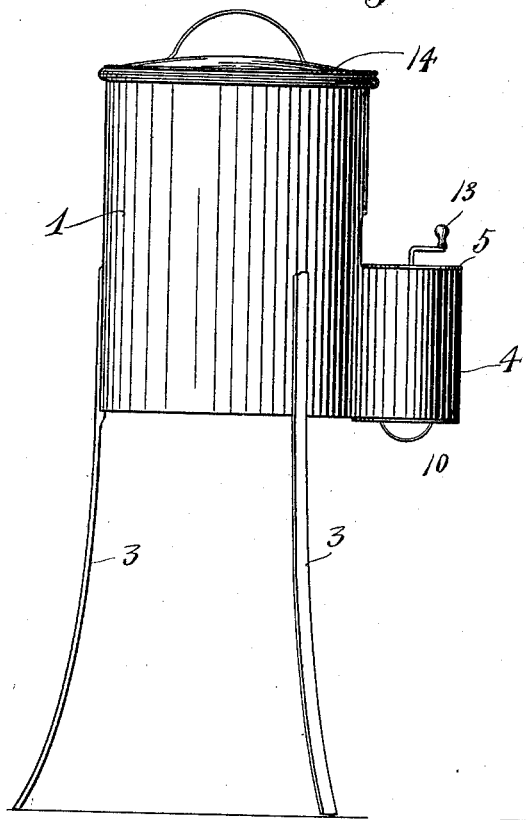
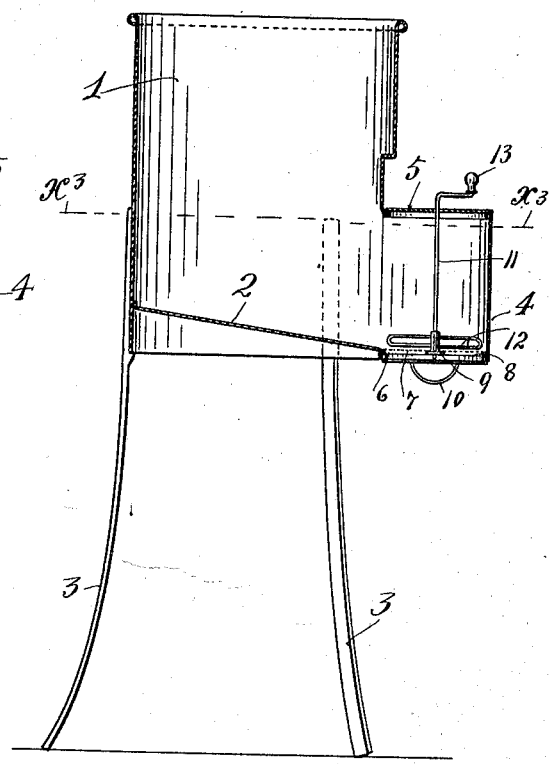
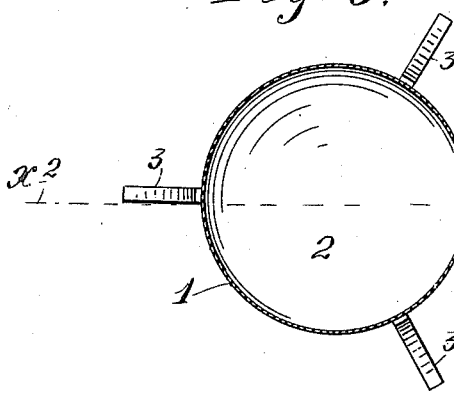
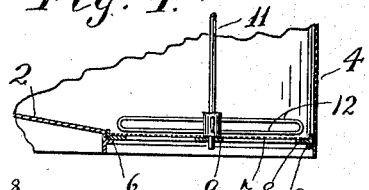
Witnesses.
A. H. Opsahl
Inventor.
Roy. N. Holmes.
By his Attorneys.
Williamson & Merchant

UNITED STATES PATENT OFFICE.

ROY N. HOLMES, OF MINNEAPOLIS, MINNESOTA.

COMBINED FLOUR TANK AND SIFTER.

SPECIFICATION forming part of Letters Patent No. 719,337, dated January 27, 1903.

Application filed February 13, 1902. Serial No. 93,895. (No model.)

*To all whom it may concern:*

Be it known that I, ROY N. HOLMES, a citizen of the United States, residing at Minneapolis, in the county of Hennepin and State of Minnesota, have invented certain new and useful Improvements in a Combined Flour Tank and Sifter; and I do hereby declare the following to be a full, clear, and exact description of the invention, such as will enable others skilled in the art to which it appertains to make and use the same.

My invention relates to combined flour tanks and sifters, and has for its object to improve the same in the several particulars hereinafter noted.

To the above ends the invention consists of the novel devices and combinations of devices hereinafter described, and defined in the claims.

The invention is illustrated in the accompanying drawings, wherein like characters indicate like parts throughout the several views.

Figure 1 shows the complete device in side elevation. Fig. 2 is a vertical section through the device on the line $x^2\ x^2$ of Fig. 3. Fig. 3 is a horizontal section on the line $x^3\ x^3$ of Fig. 2, and Fig. 4 is an enlarged detail on the same line as Fig. 2.

The numeral 1 indicates a vertically-disposed and preferably cylindrical tank which is open at its top and provided with an inclined bottom 2. The tank 1 is shown as supported by three legs 3.

The tank 1 is provided at one side and at the lowest point of its inclined bottom 2 with a laterally-projecting and relatively small cylindrical section 4, which is open both at its top and bottom and communicates with the interior of the said tank 1 at its inner side. The upper end of the section 4 is adapted to be closed by a disk-like cover 5. Just above its extreme lower end the small cylindrical section 4 is provided with a horizontally-extended annular stop-flange 6, and resting on this flange is a disk-like screen 7, shown as provided with an annular reinforcing frame 8, having a diametrically-extended bar 9. The lower end of said section 4 is adapted to be temporarily closed by a downwardly-removable imperforate cover 10.

A flour-agitator or stirring device, made up of the crank-shaft 11 and radial blades 12, works within the small cylindrical section 4. More specifically stated, the lower end of the crank-shaft 11 is journaled in the cross-bar 9 of the screen-frame 8, while the said arms or blades 12 work over the upper surface of the screen-bottom 7. The upper end of said shaft 11 extends through the upper cover 5 and is provided at its crank end with a handpiece 13. As is obvious, this agitating or shifting device is removable from working position with the cover 5.

The numeral 14 indicates a removable cover for the upper end of the tank 1.

The operation of the device is obvious. The flour within the tank 1 will, of course, keep working down into the laterally-projecting cylindrical sections 4 and onto the screen-bottom 7. When the bottom cover 10 is removed and the agitating device 11 12 is rotated, flour will be sifted through the said bottom 7. Thus an ample supply of flour is always afforded to the screen-bottom 7, and at the same time the weight of the main body of the flour is not thrown onto the said screenbottom. Hence the flour on the screen-bottom is always left in loose condition, so that it may be more readily sifted and more easily stirred by the agitating device than when packed under pressure, as from a heavy overlying body of flour. The receptacle which is to receive the sifted flour is held or otherwise supported just below the open lower end of the laterally-projected section 4, and by reference to the drawings it will be noted that the legs 3 are so spaced that a very large pan or receptacle may be thus held.

The device above described is of small cost and has many points of advantage over the old form of combined flour tank and sifter. It will of course be understood that the invention above described is capable of some modification within the scope of my invention as herein set forth and claimed.

What I claim, and desire to secure by Letters Patent of the United States, is as follows:

1. The combination with a flour-tank having a laterally-offset vertically-disposed cylinder communicating with said tank through a lateral opening and provided with the screened bottom, of an agitating or stirring device within said cylinder working over the screened bottom thereof, substantially as described.

2. The combination with the tank 1 with inclined bottom 2 and laterally-projected relatively small cylindrical section 4 open at the top and bottom and provided at its lower end with the annular stop-flange 6, of the removable screen-bottom 7 with marginal flange 8 and bar 9, resting on said flange 6, the removable cover 5 for the upper end of said section 4, and the agitating device comprising the crank-shaft 11 journaled in said cover 5 and in the bar 9 of said frame 8 and provided with the arms 12, said parts operating substantially as described.

In testimony whereof I affix my signature in presence of two witnesses.

ROY N. HOLMES.

Witnesses:
E. H. KELIHER,
F. D. MERCHANT.